Nov. 8, 1927.

V. A. BEAN

CHAIN FASTENER

Filed Sept. 18, 1926

1,648,104

Inventor
V. A. Bean,
By Clarence A. O'Brien
Attorney

Patented Nov. 8, 1927.

1,648,104

UNITED STATES PATENT OFFICE.

VITAL A. BEAN, OF KEENE, NEW HAMPSHIRE.

CHAIN FASTENER.

Application filed September 18, 1926. Serial No. 136,318.

This invention relates to a chain fastener such as is used in connection with automobile tire casings for connecting the ends of the side chains together.

Briefly, the invention has reference to a device of this class which includes two relatively movable members in sliding contact, one member being provided with an eye at one end for permanent connection to one end of the side chain, and the other member carrying a hook with which the complemental end of the side chain is detachably connected.

Means is provided for maintaining the members in assembled relation and spring means is added to complete and render the device practical. The invention is characterized by simplicity, inexpensiveness of manufacture, practicability, and manufacturing advantages which insure quantity output, and ease of machining and manufacturing.

Other features and advantages will become apparent from the following drawings and description.

In the drawings:—

Figure 1:
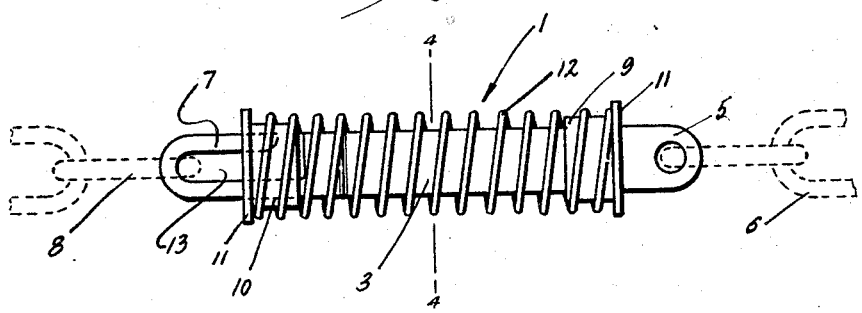
Figure 1 is a side view of a fastener constructed in accordance with the invention, showing the manner in which it cooperates with the ends of the chain.
Figure 2:
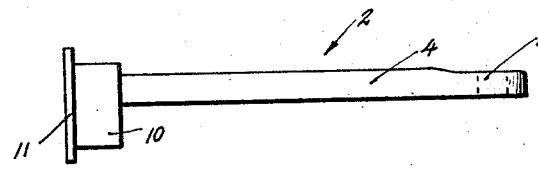
Fig. 2 is a top plan view of one of the details.
Figure 3:
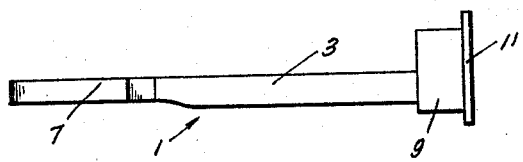
Fig. 3 is a top plan view of another one of the details.
Figure 4:
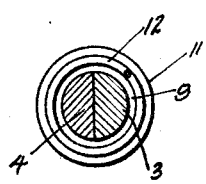
Fig. 4 is a cross section taken approximately upon the plane of the line 4—4 of Fig. 1.

The device comprises two principal parts 1 and 2. Each part is in the form of a semi-cylindrical member, one of which is designated by the reference character 3 and the other one of which is designated by the reference character 4. The member 4 is flattened at one end as at 5 and formulated with an opening, thus providing an eye for connection of the end link on the chain-end 6. On the opposite end of the other member 3 a hook 7 is formed and this is provided to permit detachable connection of the other chain-end 8, as shown in Fig. 1. The flat faces of the members 3 and 4 are arranged in sliding contact, and they are maintained in such relation by duplicate collars 9 and 10 respectively, each collar being provided with an outstanding shoulder forming flange 11 for the ends of the coiled spring 12.

Figure 5:
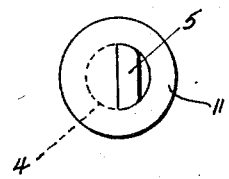
Fig. 5 is an end view looking from right to left in Fig. 1.

The collars are formed integral with said members in any suitable manner, and it will be noticed from the end view in Fig. 5, that this allows the eye 5 to project through the semi-circular opening at the right hand end and the hook 7 to project through the correspondingly shaped opening in the collar 10 at the opposite end. The spring 12 is of the expansion type and exerts an endwise pressure upon the flanges 11. With this arrangement, the bill of the hook 7 normally extends into the opening in the collar 10 thus covering the entrance to the slot 13, in which the link 8 is placed.

Obviously, by moving the collars toward each other against the tension of the spring, the hook and eye are projected to permit connection of the links of the chain. Upon releasing the collars, the spring moves them to the respective positions indicated in Fig. 1. The chain end 6 is permanently connected with the eye 5, detachable connections being with the hook 7.

The structure is sturdy, practical, easy to operate, and positive in operation, thus preventing accidental separation of the ends of the chain.

By considering the description in connection with the drawings, a clear understanding of the invention will be obtained. Therefore a more lengthy description is thought unnecessary.

Having thus described my invention, what I claim as new is:—

A chain fastener comprising a pair of semi-cylindrical members, the flat sides of which are arranged in sliding contact, one member being provided at one end with an eye and the other member being provided at an opposite end with a hook, cylindrical collars formed integrally with the members at the other ends thereof and having openings to receive the members, said collars being provided with outstanding flanges at their ends, and a coiled spring surrounding said members and said collars and bearing at its opposite end against said flanges.

In testimony whereof I affix my signature.

VITAL A. BEAN.